United States Patent [19]
Wehde

[11] 3,739,248

[45] June 12, 1973

[54] SELF STARTING ELECTRICAL MOTOR

[75] Inventor: Heinz Wehde, Heidelberg, Germany

[73] Assignee: Teldix GmbH, Heidelberg, Germany

[22] Filed: Dec. 13, 1971

[21] Appl. No.: 207,292

[30] Foreign Application Priority Data
Dec. 12, 1970   Germany.................... P 20 61 391.6

[52] U.S. Cl. ............... 318/138, 318/171, 318/254, 310/41, 310/156, 310/162
[51] Int. Cl. .......................................... H02k 29/00
[58] Field of Search ..................... 310/41, 154, 155, 310/156, 162; 318/138, 254, 171

[56] References Cited
UNITED STATES PATENTS
3,121,815   2/1964   Sidell............................. 310/156 X

| | | | |
|---|---|---|---|
| 2,867,762 | 1/1959 | Lehman et al...................... | 318/254 |
| 3,091,728 | 5/1963 | Hogan et al. ........................ | 318/138 |
| 3,096,467 | 7/1963 | Angus et al........................ | 318/138 |
| 3,041,513 | 6/1962 | Reiches............................. | 310/41 X |

*Primary Examiner*—Gene Z. Rubinson
*Attorney*—George H. Spencer, Harvey Kaye and Jay M. Finkelstein

[57]  ABSTRACT

This invention relates to an electrical motor comprising a permanent magnetic rotor, a stator provided with a single phase operated winding and at least one auxiliary permanent-magnetic pole mounted on the stator for self-starting of said motor in a given direction, and more particularly to an electrical motor which is controlled in starting and running operation.

17 Claims, 5 Drawing Figures

SELF STARTING ELECTRICAL MOTOR

BACKGROUND OF THE INVENTION

It is well known that electrical motors and more particularly single-phase operated synchronous motors require specific means to assure motor starting in a given direction. In order to achieve the starting in a given direction, the surface of the synchronous motor stator poles are — according to the Laid Open German Patent Application No. 1,488,278 — so constructed that a continuously decreasing air gap results between the rotor and the individual stator poles. Thus, the permanent-magnet rotor assumes a position at standstill which is slightly different from that of the rotor with current flow of a given polarity.

SUMMARY OF THE INVENTION

An object of the invention is to provide a high efficiency electrical motor triggered by pulses and starting in a given sense of direction. This and other objects and features of the invention are pointed out in the following description in terms of the embodiment thereof which is shown in the accompanying drawing. It is to be understood, however, that the drawing is for the purpose of illustration only and is not a definition of the limits of the invention.

This problem was solved by providing the stator with at least one auxiliary magnetic pole which is so mounted that, due to the magnetic effect of one or several auxiliary magnetic poles, the rotor poles are displaced from those of the stator.

For reasons of symmetry, it is preferable to employ at least two auxiliary magnetic poles mounted diametrically opposite each other. It is even more favorable to provide the same number of auxiliary magnetic poles as there are rotor poles and to mount them equally spaced, on the stator circumference. Auxiliary magnetic poles on the stator circumference being adjacent to each other must be opposite in polarity. The one or several auxiliary magnetic poles can be obtained by applying a thin layer of permanent-magnetic material to at least a part of the rotor surface facing the stator surface, and by radial magnetization of this layer. It is preferable to provide the stator with a complete ring of permanent-magnetic material. In case $2n$ auxiliary magnetic poles are used, the magnetic axis of each pole lies on the angle bisector of the angle enclosed by the centerlines of two adjacent stator poles. In that case, the change in polarity in the permanent-magnetic layer lies approximately on the centerline of the stator poles.

The thin layer of permanent-magnetic material can simply be produced by spraying a permanent-magnetic powder, in particular an oxide powder, bound in thermoplastic and thermosetting compounds. In order to increase layer adhesion, the stator pole surfaces can be provided with grooves.

However, it is also possible to mount the one or several auxiliary magnetic poles on one or both lateral faces of the stator, that is, on the surface (top view) shown in FIG. 1 and/or on the opposite surface of the stator (1). As for distribution and mounting of said poles, similar design considerations are applicable as above. It is important that the auxiliary magnetic poles are mounted to hold the rotor at stand-still in a position in which each rotor magnet axis does not coincide with the mid-vertical of a stator pole, but is displaced from it.

Preferably, the stator is provided with $2n$ stator poles and the stator winding is so designed that adjacent stator poles show an opposite polarity in case of current flow. In this case, the motor can also be operated by pulses, e.g. pulses of identical polarity. To assure motor starting, the time interval of the pulses must continuously decrease during the starting phase up to normal speed in such a manner that the rotor continues to increase its motion.

For starting the motor, pulses of alternating polarity can also be applied. In that case, too, it is necessary to continuously decrease the pulse time interval. The polarity of the initial pulse determines the sense of rotation.

The electrical motor of the present invention is, for instance, suitable as a drive motor for gyro rotors. If triggering with pulses of one polarity is used, the motor is particlarly suited to drive gyro rotors to which the drive energy is transmitted in the form of a pulse-modulated high-frequency voltage, since the rectification of the motor of the present invention can very easily be carried out. In the accompanying drawing, in which certain modes of carrying out the present invention are shown for illustrative purposes:

DESCRIPTION OF THE PREFERRED EMBODIMENTS

Figure 1:
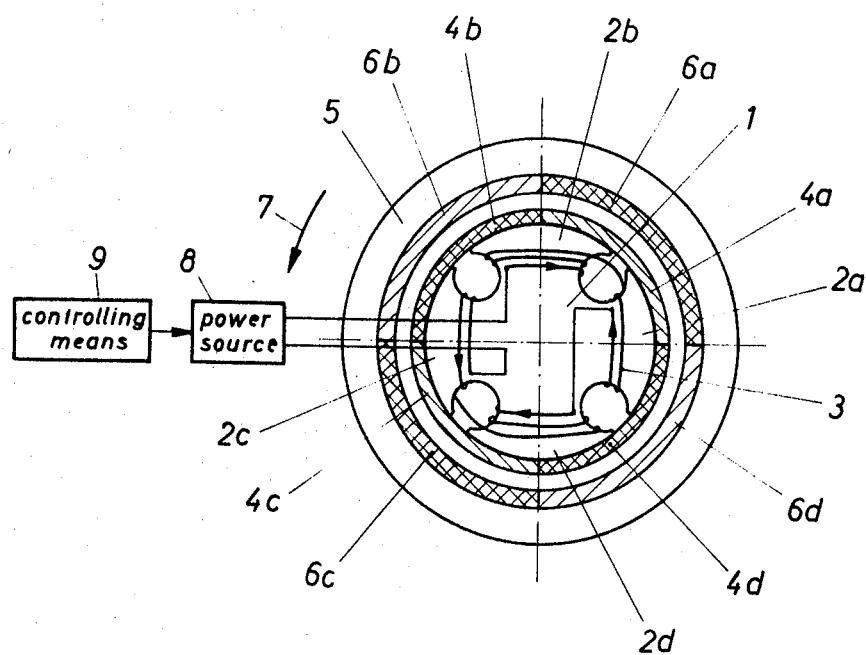
FIG. 1 is a schematic representation of a motor having a rotor and a stator which embodies the present invention

The schematic representation of the embodiment in FIG. 1 provides details of the invention. The drawing shows a motor with an internal stator 1 provided with four ($n = 2$) poles 2a through 2d. The exciting windings 3 shall be so wound that, in case of current flow, adjacent poles are of opposite magnetization. The windings are connected in parallel or series. The stator 1 is provided with a permanent-magnet layer consisting of four segments 4a through 4d. This layer is so magnetized in a radial direction that four auxiliary poles are obtained of which those being adjacent to each other are of opposite polarization as shown in the drawing by the different shading. Hereby, the permanent magnetization is so applied that the change in polarity runs along the stator pole centerline vertical to the sense of rotation i.e. the centers of the auxiliary poles are angularly offset from the centers of the poles 2. As mentioned above, the auxiliary magnetic poles can be applied by radially spraying a granular permanent-magnet material mixed with a binder compound onto the stator, and by magnetizing it thereafter to assure the above distribution.

The annular rotor consists of a ring 5, made from soft iron or a similar material, and of a second inner ring consisting of four segments 6a through 6d, which are radially magnetized representing four rotor magnets of which the adjacent magnets are of opposite polarization. Here, too, the different magnetization is shown by two kinds of shading.

If there flows no current in the windings 3, the rotor attains its position shown in FIG. 1 or a position displaced by 180°, since the inner north and south poles of the rotor magnets 6a through 6d are placed opposite the outer north or south poles of the auxiliary magnets 4a through 4d.

If a DC pulse of a given polarity is applied to the exciting windings 3 generating in the stator poles a much stronger radial field than that of the auxiliary poles 4a through 4d, then a torque is applied to the rotor resulting in an accelerated motion in a given direction, e.g. in the direction shown by the arrow 7, depending on the sense of winding and the pulse polarity. Before the axis of the magnet field, of the rotor magnetic poles 6a through 6d are opposite the stator poles 2b, 2c, 2d 2a, the pulse applied to the windings must terminate so that no deceleration results impeding the rotor's motion.

The magnetic force of the auxiliary magnetic poles 4a through 4d has to be so small that it does not decelerate to a great extent the rotary motion of the rotor, but that the rotor continues rotating due to its inertia when the rotor magnet 6a approaches the auxiliary magnet 4b of identical polarity, and the remaining rotor magnets their corresponding auxiliary magnets. After the rotor has turned to the position where the axis of the magnetic field of the rotor poles 6a through 6d have already passed the axis of the magnetic field of the auxiliary poles 4b, 4c, 4d and 4a (slightly more then 90° compared to the position shown in FIG. 1), then the interaction of the rotor poles and the auxiliary poles results in an acceleration of the rotor. The starting circuit must be so designed that it furnishes a second pulse of identical polarity to the winding when the axis of the magnetic field of the rotor pole 6a has passed the symmetry line of the stator pole 2c (slightly after 135°); the same applies to the rotor poles 6b through 6d regarding the auxiliary magnets 2d, 2a and 2b. The following pulse causes another acceleration of the rotor; the pulse must terminate before the rotor poles are again opposite the succeeding stator poles. Due to the increase in rotary speed, the following acceleration pulse must be furnished earlier than the one before and must be of shorter duration; that is, during the starting operation a pulse sequence of an increasing pulse repetition frequency and a decrease in pulse width are required until the rated speed is attained.

Figure 2:
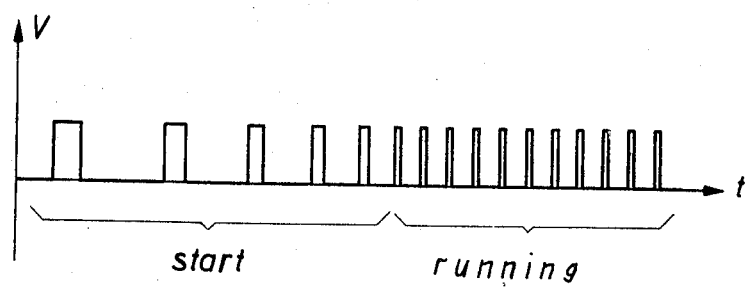
FIG. 2 shows a pulse sequence for triggering the power source of the electrical motor.

The exciting windings 3 are connected with a power source 8 triggered by controlling means 9. Said controlling means are well known in art and for example described in the Laid Open German Patent Application No. 1,538,057 and are producing trigger pulses as shown in FIG. 2. The pulse duty cycle (duration of pulse/time period between two pulses) during the starting operation is 0.25. If the windings are excited with different polarity torques would act on the rotor after each quarter revolution of the rotor.

Figure 3A:
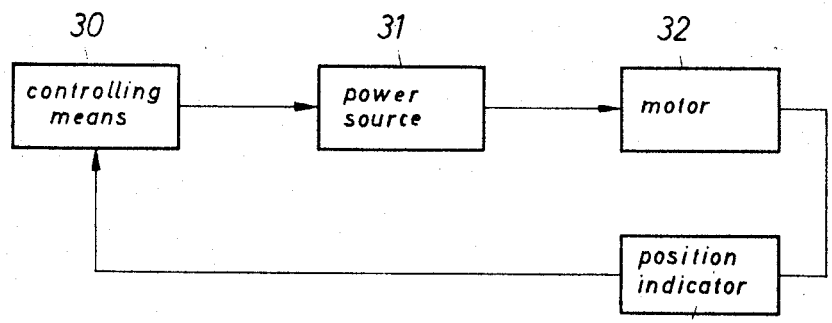
FIG. 3a shows a schematic diagram of the controlling system.

In the schematic diagramm of FIG. 3a the electrical motor 32 is coupled with a position transducer or indicator 33 for scanning the position of the rotor. This position transducer is one of well known art with inductive or capacitive means for instance. A very favorable embodiment with photo-electrical means will be described later on. The position indicator is producing signals in dependence of the position of the rotor, which signals are fed to controlling means 30. Said controlling means are needed to trigger a power source 31, so that the speed of the motor 32 is controlled by pulse width modulation. Said signals can be needed also for controlling the amplitude of a DC voltage produced by said power source 31. Besides the starting also the running operation of the motor can be controlled by said means.

Figure 3B:
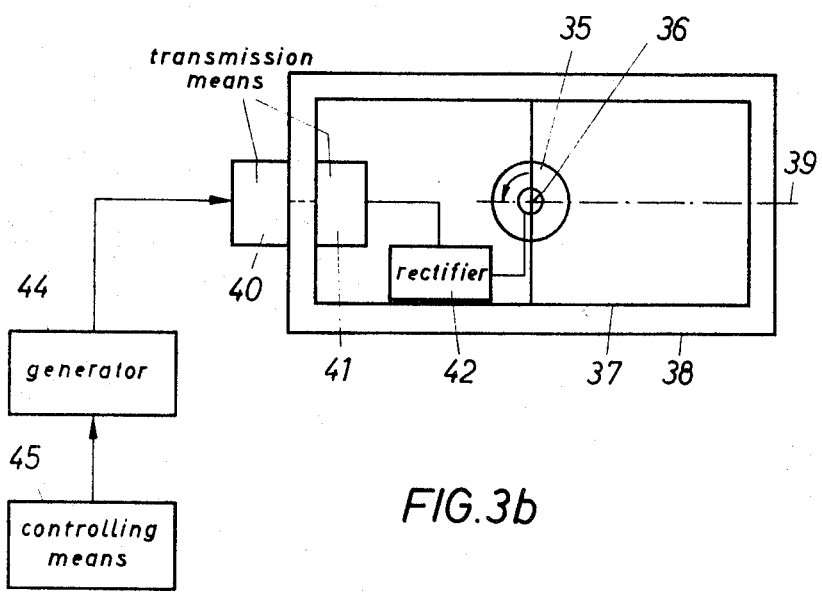
FIG. 3b shows a schematic view of the electrical motor used for driving a gyro.

FIG. 3b shows a schematic view of the electrical motor used for dirving a gyro. Controlling means 45 are triggering a generator 44 for producing a pulse modulated high-frequency voltage. Furthermore a gyroscope comprising a pivotally mounted gimbal 37 provided with the rotor 35 and stator 36 of an electrical motor. Said gimbal is pivotally mounted about the axis 39 in another gimbal or the housing 38 of the gyro. The gimbal 37 and the housing 38 are provided with transmission means for transmitting said high-frequency voltage to the gimbal 37 and stator 36 of the motor without any contact between the housing 38 and the gimbal 37. Such transmission means are well known in art and are comprising inductive or capacitive means. In the published German Patent Application (DAS) No. 1,274,803 said means are discribed in detail. The rectifier 42 rectifies the high frequency voltage in a pulsed direct current voltage and feeds that voltage to the stator 36. Controlling means may be provided with a position transducer as shown in FIG. 3a.

Figure 4:
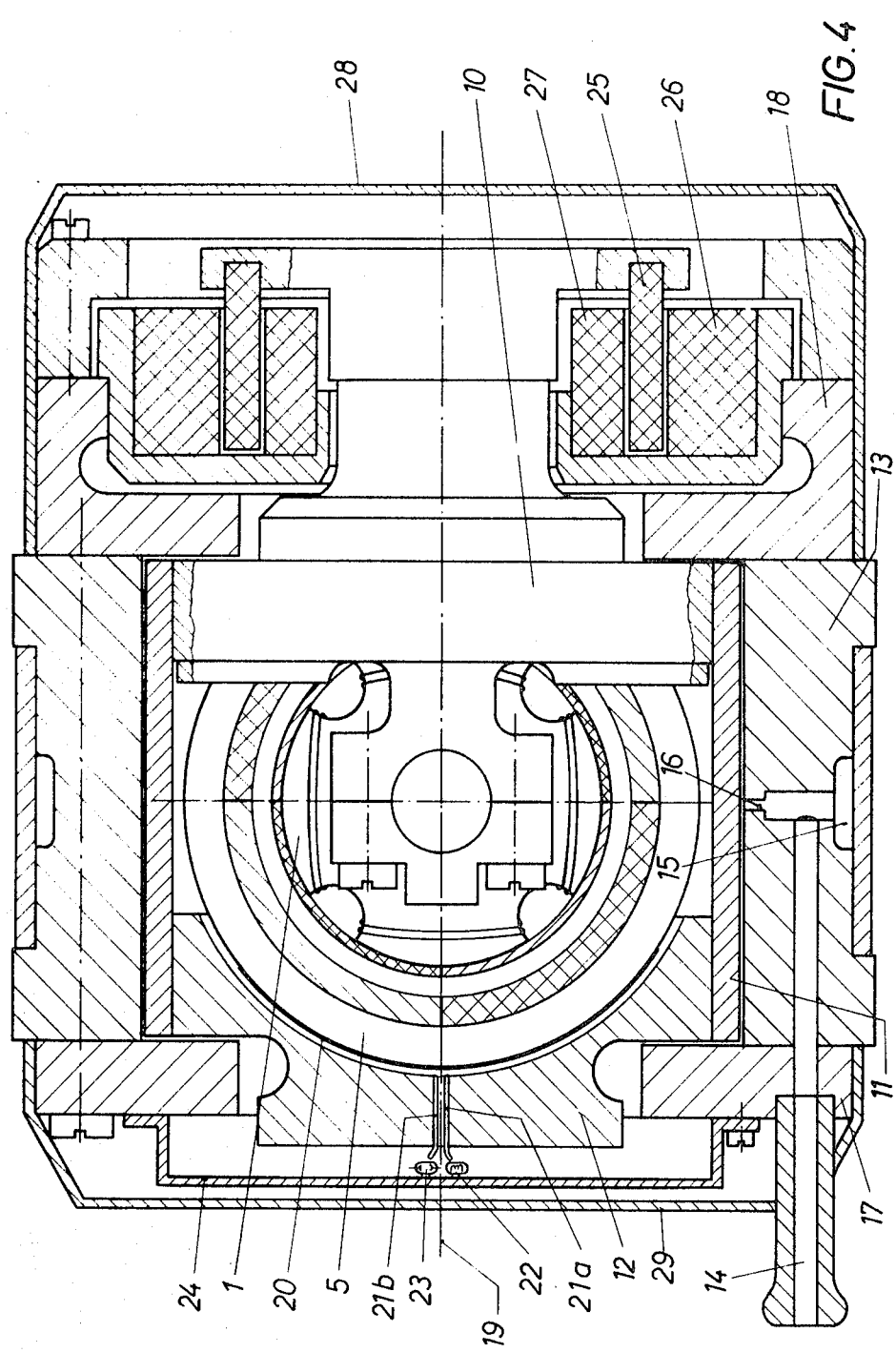
FIG. 4 is a longitudinal section through a rate gyro provided with gas bearings and the modified rotor of FIG. 1.

FIG. 4 shows the motor of the present invention used as a drive motor of a rate gyro comprising a gas bearing. The stator 1 of the motor is mounted on a motor bearing support 10 which is fixed to the cylindrical sleeve 11 by means of an annular disk 12. The cylindrical sleeve 11 in conjunction with the air-feed sleeve 13 forms a static gas bearing whereby the gas supply takes place via an inlet piece 14, an annular channel 15 and nozzles 16 equally spaced on the circumference of the annular channel.

The gimbal of the gyro comprising the sleeve 13 and the motor bearing support 10 is pivoted about the elevation axis 19 with regard to the rate gyro housing which comprises the thrust plates 17 and 18. The outer surface of the rotor 5 is provided with markings 20. One marking located diametrically opposite the one shown in the drawing is covered by the motor bearing support.

The markings 20 are so prepared that they absorb the light from a light source while the the rotor surface between the markings reflects it. Very close to the elevation axis, there are photo conductive means for instance the glass fibers 21a and 21b on the annular disk 12 which is fixed to the motor bearing support 10. A light source 22 and an photoelectric transducer 23, for instance a photo cell, are mounted on the ring 24. With this arrangement, the light emitted by the light source 22 is directed to one end of the glass fibers 21a and is transmitted to the rotor surface through the glass fibers. If the rotor is in a position at which the light beam strikes a marking 20, the light is absorbed. However, if the rotor has assumed a position at which no marking is opposite the glass fibers 21a, the light is reflected and transmitted through the glass fibers 21b to the photoelectric transducer 23. Thus, the position transducer, comprising the light source 22, photoelectric transducer 23, glass fibers 21a and 21b and the markings 20, generates the electrical signals depending on the rotor position without generating undesirable torques about the elevation axis 19. With the above rate gyro, this fact is of vital significance since undesirable torques about the elevation axis 19, also called the sensitive axis, would considerably decrease the rate gyro's accuracy.

The motor bearing support 10 is also equipped with coils 25 which in conjunction with the magnets 26 and the coils 27 result in a combination of torquer and position transducer. The magnets 26 and the coils 27 are mounted on a plate which is part of the gyro housing. The above torquer and position transducer are described in detail in the German Laid Open Patent Application No. 1,807,477 and are of no significance as to the present invention. Two covers 28 and 29 enclose the above rate gyro.

The invention may be carried out in other specific ways than those herein set forth without departing from the spirit and the essential characteristics of the invention, and the present embodiments are, therefore, to be considered in all respects as illustrative and not restrictive, and all changes coming within the meaning and equivalency range of the appended claims are intended to be embraced therein.

I claim:

1. A self-starting single-phase electrical motor comprising, in combination: a permanent magnet rotor composed of a plurality of rotor poles having polarities which alternate about the rotor periphery; a stator having an outer surface facing said rotor and about which said rotor is rotatably mounted, said stator including a plurality of first stator poles; single phase excitation windings wound around said first stator poles to have alternately opposite winding directions from one said first stator pole to the next, current through said excitation windings producing a substantially radially directed magnetic field in front of said first stator poles; source means connected to supply such current to said excitation windings; and means defining at least two permanent magnetic auxiliary poles on said outer surface facing said rotor, said auxiliary poles being magnetized in a substantially radial direction and having a polarity which alternates around the periphery of said outer surface with the centers of said auxiliary poles being angularly offset from the centers of said first stator poles.

2. A motor as defined in claim 1, wherein said auxiliary poles are equally spaced apart.

3. A motor as defined in claim 1, wherein said source means comprises a source of voltage pulses of one polarity coupled to said excitation winding.

4. A motor as defined in claim 1, wherein said source means produces voltage pulses, and further comprising controlling means having its output coupled to said source means for reducing the duration and increasing the repetition frequency of the pulses during starting of said motor.

5. A motor as defined in claim 4, further comprising position for developing means coupled to said motor for developing an output signal indicative of the position of said rotor, and wherein said controlling means is coupled to said position transducer and is responsive to its output signal.

6. A motor as defined in claim 1, wherein said means defining auxiliary poles comprise a thin layer of permanent magnetic material forming at least part of said outer surface of said stator.

7. A motor as defined in claim 6, wherein said auxiliary poles are radially magnetized, the magnetic axis of each said auxiliary pole lying on the angle bisector of an angle enclosed by mid-verticals of two adjacent first stator poles.

8. A motor as defined in claim 6, wherein said permanent magnetic material is an oxide powder bound with a thermoplastic or thermosetting material.

9. A motor as defined in claim 1, wherein adjacent ones of said first stator poles are magnetized with respectively opposite polarities upon flow of current in said excitation windings.

10. A motor as defined in claim 1, further comprising an inner gimbal of a gyroscope, said rotor being pivotally mounted on said inner gimbal for driving the gyroscope.

11. A motor as defined in claim 10, further comprising position transducer means coupled to said motor and responsive to the position of said rotor for developing an output signal indicative of the position of said rotor, and controlling means coupled to said transducer means and responsive to its output signal for developing a control signal, and wherein said source means is coupled to said controlling means and responsive to its control signal for generating an excitation signal.

12. A motor as defined in claim 10, wherein said source means includes generating means for generating a pulse-modulated high-frequency voltage, means coupled to said generating means for transmitting such voltage, through said gimbal and rectifier means within said gimbal for rectifying the voltage to produce an excitation signal, said excitation winding being coupled to said rectifier means for receiving the excitation signal there-from.

13. A motor as defined in claim 10, wherein said source means comprises generating means for generating a pulse-modulated high-frequency voltage, inductive means coupled to said generating means for transmitting the voltage through said gimbal, and rectifier means mounted on said gimbal for rectifying the voltage to produce an excitation signal, said excitation winding being coupled to said rectifier means for receiving the excitation signal therefrom.

14. A motor as defined in claim 10, wherein said source means comprises generating means for generating a pulse-modulated high-frequency voltage, capacitive means coupled to said generating means for transmitting the voltage through said gimbal, and rectifier means mounted on said gimbal for rectifying the voltage to produce an excitation signal, said excitation winding being coupled to said rectifier means for receiving the excitation signal therefrom.

15. A motor as defined in claim 10, further comprising position transducer means including photo-electric means responsive to the position of said rotor for developing an output signal indicative of the position of said rotor, and controlling means coupled to said transducer means and responsive to its output signal for developing a control signal, said source means being coupled to said controlling means and responsive to the control signal therefrom for generating an excitation signal.

16. A motor as defined in claim 15, further comprising a gyroscope housing and wherein said photo-electric means includes a light source and photo-electric transducer means mounted on said housing, light conducting means mounted on said gimbal in close proximity to its axis, and markings for absorbing light provided on said outer surface of said rotor.

17. A motor as defined in claim 16, wherein said light conducting means are glass fibers.

* * * * *